May 25, 1965
D. C. MULLER
3,185,108
PEDESTRIAN CARRIER
Filed July 10, 1963
4 Sheets-Sheet 1
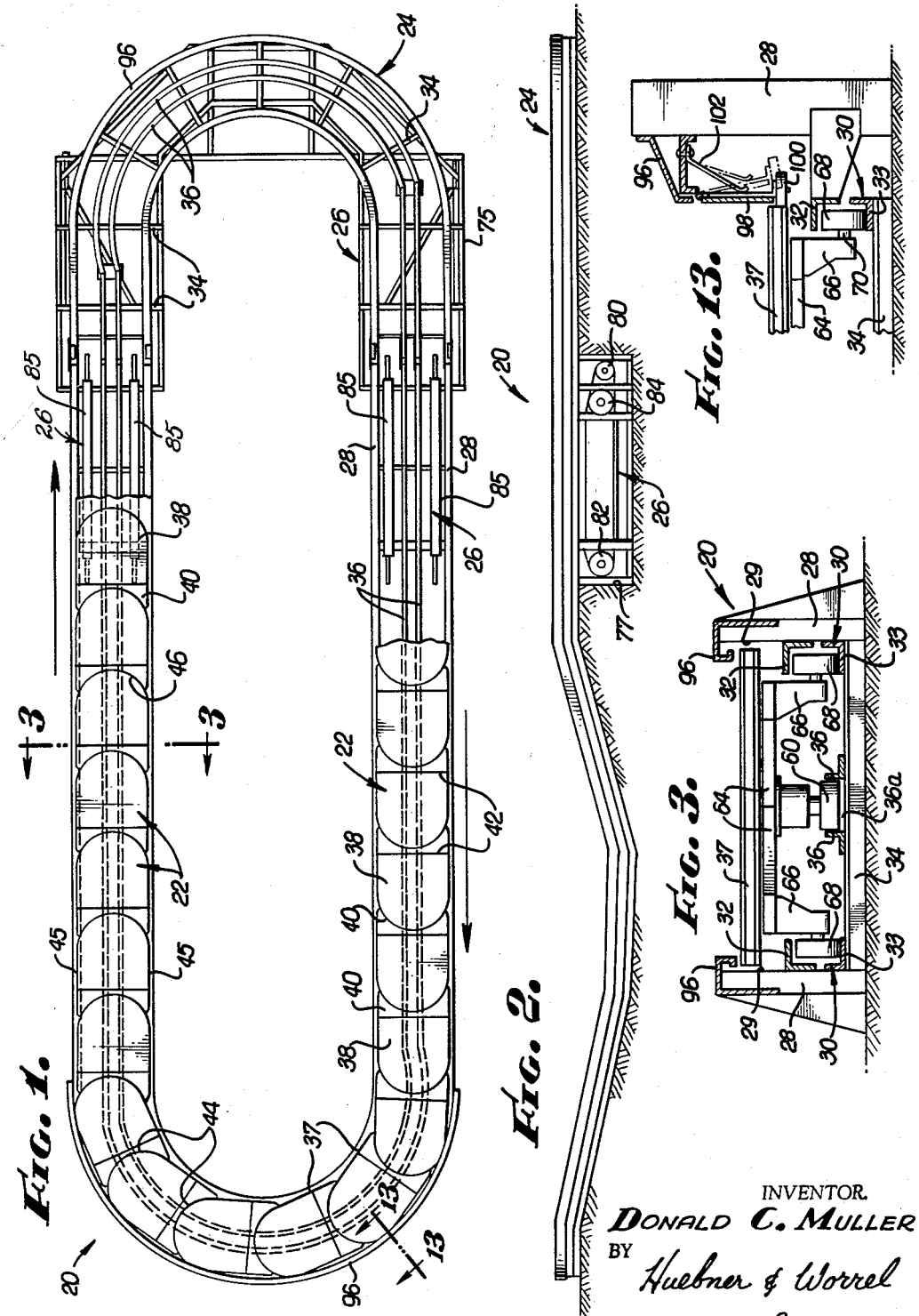
INVENTOR.
DONALD C. MULLER
BY
Huebner & Worrel
ATTORNEYS.

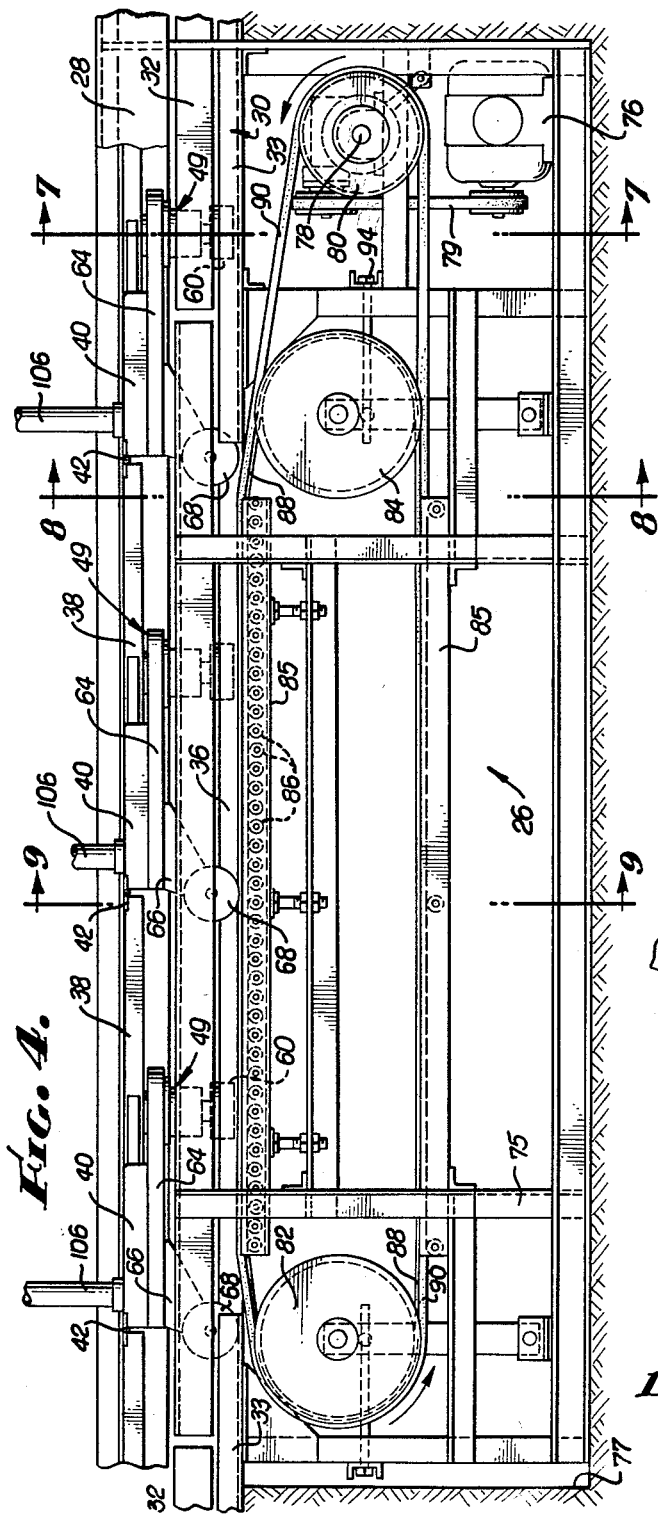
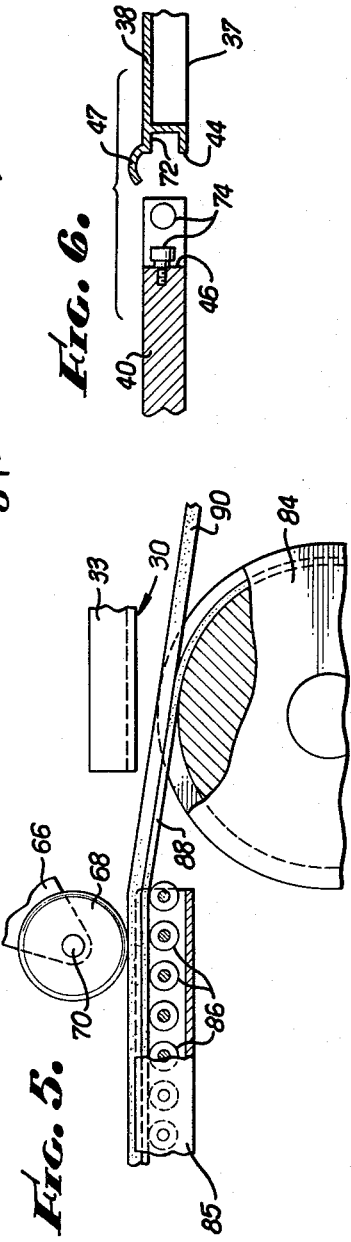

May 25, 1965  D. C. MULLER  3,185,108
PEDESTRIAN CARRIER
Filed July 10, 1963  4 Sheets-Sheet 3

INVENTOR.
DONALD C. MULLER
BY
Huebner & Worrel
ATTORNEYS.

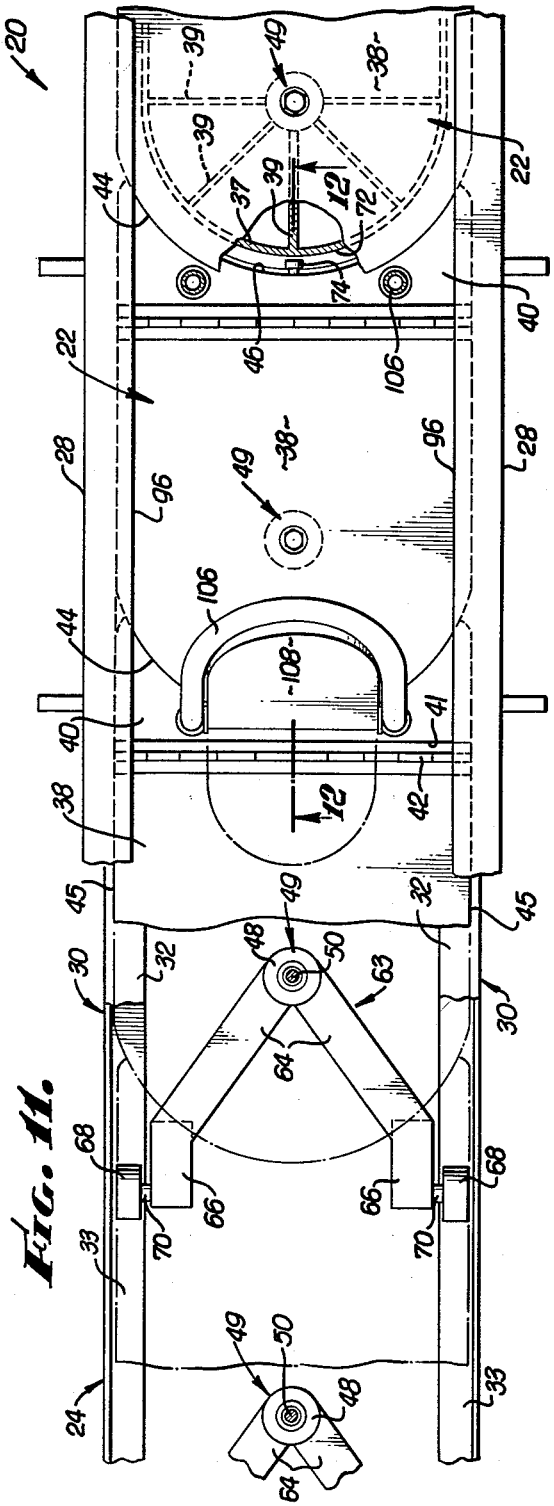
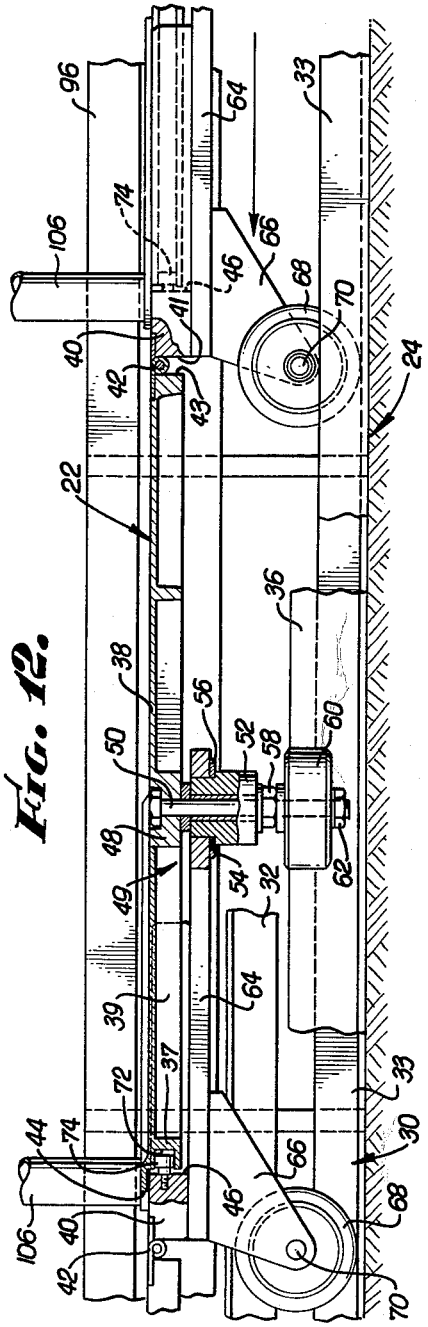

United States Patent Office 3,185,108
Patented May 25, 1965

3,185,108
PEDESTRIAN CARRIER
Donald C. Muller, Whittier, Calif., assignor to C. F. Butz Engineering, Azusa, Calif., a corporation of California
Filed July 10, 1963, Ser. No. 293,952
10 Claims. (Cl. 104—25)

This invention relates to a pedestrian carrier and more particularly to an endless horizontal pedestrian transporting structure which includes a plurality of articulated platform or pallet members which are adapted to ride on a supporting guide track means and the platform or pallet members are moved by means of a power drive means.

An object of this invention is to provide a pedestrian carrier which may be adapted for use on terrain which need not be perfectly flat. The pedestrian carrier is capable of being used on slightly inclined and declined areas.

Another object of this invention is to provide a pedestrian carrier which includes a permanently mounted track and drive means and articulated platform members which form a continuous endless surface whereby a person may step upon the surface and may be moved from one place to another and the endless surface will conform to the contour of the terrain upon which the assembly is laid.

A further object of this invention is to provide hinged platform members so that they may be adapted to conform to inclined or declined terrain over which it is installed; further, the platform members are pivotally secured to each other so that the endless surface may be moved around a curve, thus creating a generally universal movement to the platform members.

These and other objects of the invention will become more apparent from the following detailed description when taken in conjunction with the drawings, wherein:

In the drawings—

FIGURE 1 is a top plan view partially in section of the pedestrian carrier;

FIGURE 2 is a side elevational view of the carrier, illustrating how the carrier may be conformed to irregular terrain;

FIGURE 3 is a sectional view of details of the carrier taken on line 3—3 of FIGURE 1;

FIGURE 4 is a detailed side elevational view of the carrier drive means;

FIGURE 5 is an enlarged side elevational view of a portion of the drive means;

FIGURE 6 is an exploded cross sectional view illustrating the articulating details of construction of two adjoining platform members;

FIGURE 11 is an enlarged top elevational view partly in section of several of the articulated platform members;

FIGURE 12 is a cross sectional side elevational view taken on line 12—12 of FIGURE 11; and FIGURE 13 is a detailed sectional view of foot guard means taken on line 13—13 of FIGURE 1.

Figure 7:
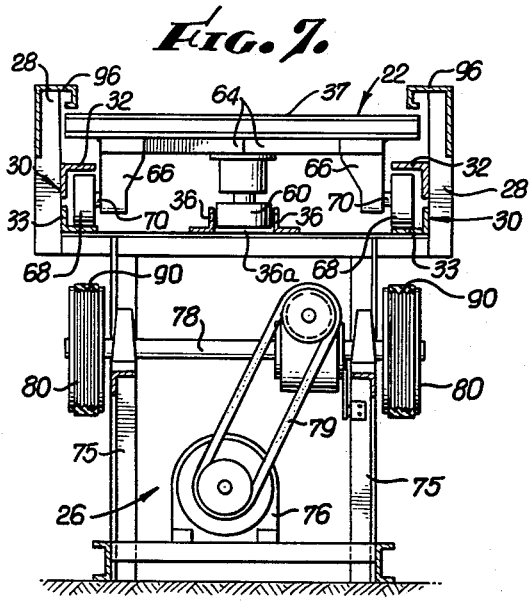
FIGURE 7 is a cross sectional view taken on line 7—7 of FIGURE 4.
Figure 8:
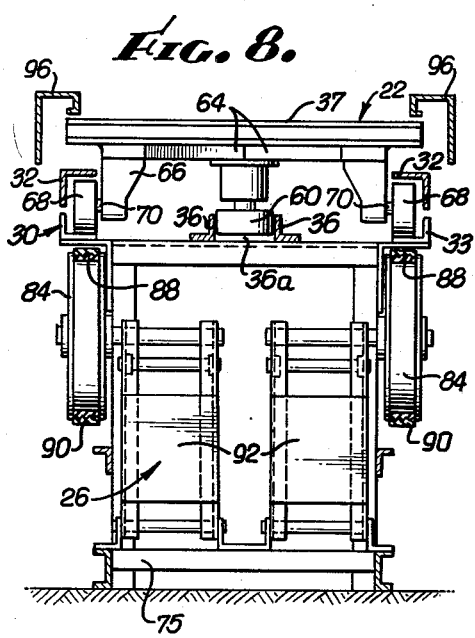
FIGURE 8 is a cross sectional view taken on line 8—8 of FIGURE 4.
Figure 9:
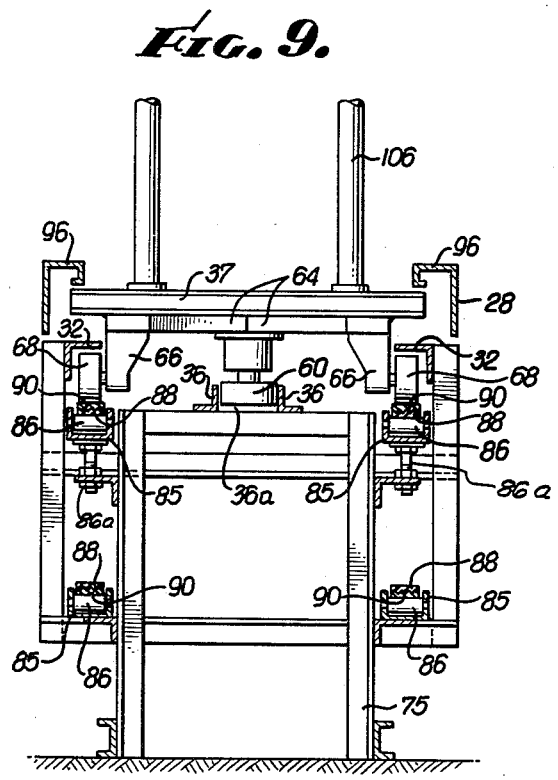
FIGURE 9 is a cross sectional view taken on line 9—9 of FIGURE 4.
Figure 10:
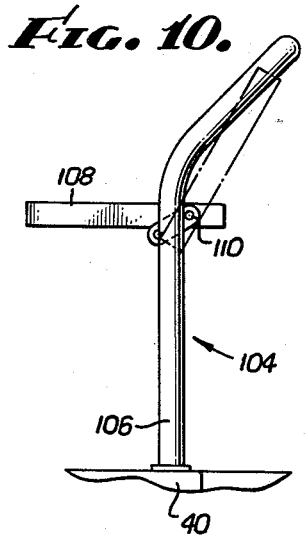
FIGURE 10 illustrates a seat which may be used in conjunction with the carrier.

In general the device consists of an endless pedestrian carrier generally designated 20 which includes a moving surface of articulated platform or pallet members generally designated 22 which ride upon track means generally designated 24. The platform members 22 are moved along the track means 24 by a drive means generally designated 26.

The track means 24 includes outer side support rails 28 which are substantially parallel and spaced from each other, and rise vertically from the ground. On the inside facing surfaces 29 of each of the support rails 28 there is formed track members 30 having upper and lower spaced parallel guide and support tracks 32 and 33. The support rails 28 are tied together by means of cross rails or bars 34 at spaced intervals. Mounted to each of the cross rails or bars 34 between the rails 30 are a pair of endless center guide rails 36 which are parallel to and spaced from each other forming a guide groove 36a. Additionally, the rails 36 are centrally located between the rails 28.

The rails 28 are normally laid out in a flattened oval or planular pattern as illustrated in FIGURE 1. However, the pattern may be endlessly irregular depending upon the course desired. The rails 30 are not endless but are broken at a position adjacent the drive means 26. The guide rails 36, however, are continuous and uninterrupted conforming to the pattern and contour assumed by the track 28.

Disposed within the support rails 28 and overlying the tracks 30 is a plurality of articulated platform or pallet frame members 37. Each member has a forward major or first platform section 38 and a minor or second platform section 40. The major sections 38 are each formed with a convex arcuate forward face 44, parallel side faces 45 and a rear face 43 which is normal to the parallel sides 45. The platform frame 37 further includes radial reinforcing ribs 39 which extend from the arcuate forward end 44 inwardly intersecting at a hub member 48. The major sections 38 are each secured to the ribs 39.

The minor platform sections 40 each have a front face 41 parallel with the face 43 of the major platform and a concave rear face 46 having an arcuate surface corresponding to the arcuate face 44 of the major platform section 38. The major and minor platform sections are joined together at the respective faces 43 and 41 by a piano type hinge 42 which normally extends the entire width of the platform section. This can best be illustrated in FIGURES 11 and 12. The major platform section 38 is formed at the forward arcuate face 44 with a forwardly extending tongue 47, best illustrated in FIGURE 6. This tongue 47 acts as a safety cover by overlapping the minor section 40 and covering the space created between the ends 44 and 46 when they are juxtaposed.

Each of the platform follower elements 49 includes a hub 48 and a downwardly depending pivot bolt 50. Each hub 48 has a rotatable stub shaft 52 journaled thereon, and the shaft 52 has an annular shoulder 54. A bearing washer 56 is mounted upon the annular shoulder 54, as best seen in FIGURE 12. A nut 58 is threadably secured on the bolt 50 to retain the stub shaft 52. A guide wheel 60 having a diameter slightly less than the width of the groove 36a is suspended on the bolt 50 between the center guide rails 36 on a vertical axis. The guide wheel 60 is held to the pivot bolt 50 by means of nut 62.

Each platform includes a bearing support means 63 comprising a pair of diverging support arms or yoke members 64 which are pivotally mounted on the annular shoulder 54 bearing upon the washer 56. The arms extend forwardly beyond the arcuate forward face 44 and each terminates in a track wheel frame 66. The track wheel frames 66 are permanently secured to the underneath of the minor platform sections 40. The support arms 64 articulate one platform with the next in linear series. Additionally, each of the frames 66 has track wheels 68 rotatably mounted on stub axles 70 projecting therefrom. The wheels 68 ride and bear upon the tracks 33.

Thus, with the diverging support arms 64 permanently secured to the minor platform section of a frame means 37 and pivotally tied to a major platform section of an adjacent frame means 38, the platform members are articulated in an endless line.

As the platforms travel on the rails 33 other than in a straight line, such as the arc at the end of the track, each platform 22 will pivot and move around the curve, such as is illustrated in FIGURE 1. When the terrain, such as illustrated in FIGURE 2, includes inclining or declining surfaces, the hinge 42 will allow the major platform section to bend upward or downward on a different plane than the minor platform section thus conforming to the terrain. It will be seen, therefore, that the individual platform sections may pivot with regard to the vertical line of travel as well as to the horizontal line of travel and are generally universally movable within the limits of the track.

In order to maintain smooth pivotal movement of the platforms 22, the forward arcuate face 44 of each of the platforms is provided with an arcuate groove 72 which rides on a plurality of rollers 74 which are spaced around the concave face 46 of the minor platform section 40. The rollers 74 are mounted to rotate in the plane of the curved face 46 and in this way friction between the respective moving platform sections will be reduced.

The preferred drive means assembly 26 for moving the articulated platforms is usually mounted in a hole 77 below the carrier 20. The assembly comprises a frame 75 and a motor 76 which is operatively connected to a shaft 78 by belt means 79. The shaft 78 is journaled in the frame 75 and mounted at each of the respective ends of the shaft 78 are drive pulleys 80. Remote from the pulleys 80 are a pair of idler pulleys 82 which are rotatably mounted in the frame in line with the drive pulleys 80. Between the two sets of pulleys 80 and 82 are a pair of inner tension pulleys 84. Extending between and above the pulleys 80 and 84 is a roller bed 85 having a plurality of freely rotatable roller elements 86. They are in parallel relationship with each other and spaced from each other, such as is seen in FIGURES 4 and 5. The roller bed 85 is also positioned between the interrupted outer support rails 28 and is at the same elevation as the track rails 33.

Inner endless tension belts 88 extend around the pulleys 82 and 84 and over the rollers 86 on the outside of the frame 75. Outer endless drive belts 90 extend around the drive pulleys 80 over the inner belts 88 and around pulleys 82. The respective sets of belts 88 and 90 on their inner surfaces are fitted together in a tongue and groove arrangement so that they will rotate together. The tension pulleys 84 are mounted on pivotal supports 92 and a tension screw 94 is provided to move the pulleys 84 to tension the inner belt and assure the correct tension of the outer belt which engages the rollers 86. With the belts 88 engaging the roller elements 86, there is provided support for the platforms as they pass over the drive means, and additionally, the roller elements 86 reduce friction which is created as the weight supporting platform means pass overhead and bear down on the belts 88.

The operation of the drive is such that when the wheels 68 of pallet members 22 contact the top surface of belts 90, the uppermost point on the perimeter of the wheels also contacts the underside of support track 32. Adjusting bolts 86a on the underside of channel 86 permit the rollers 86 and belts 90 to be raised so that wheels 68 are actually pinched between belt and track. The forward moving belt 90 then causes the wheels 68 to rotate in a reverse direction from the normal when they are traveling on track 30.

It may be necessary, depending upon the size of the pedestrian carrier, to place a plurality of drive means around the track to assure sufficient power to move the platform members depending upon the terrain, weight upon the platform and other factors. If such is necessary, the drive means would be synchronized to assure simultaneous movement.

While the motive power drive means illustrated herein is the preferred embodiment, it should be recognized that any drive means may be employed which will move the respective platforms around the track means 24.

When the respective platform or pallet members enter a curved area, the arcuate forward face 44 of the major platforms 38 will not conform directly to the arcuate shape but will tangentially project outward beyond the curve at certain points until it resumes a straight course. In order to eliminate the problem of having a pedestrian's foot become entangled in the side rails 28 should the foot be too close to the side rails, there is provided a safety foot rail as best illustrated in FIGURE 13.

Depending from a safety rail 96 on the support rail 28 is a flexible belting material 98 around the interior and exterior sides of the curved portion. At the bottom of the belting a roller 100 is mounted for horizontal rotation and is to engage the arcuate forward face 44 and side faces 45 of the major platforms. Additionally, a leaf spring 102 mounted to the side support rails 28 is tensioned against the belting urging the roller 100 into direct contact with the platform sections. As the platform sections proceed around the curved section of the track and tangentially project out beyond the curve, the roller 100 will be forced outward, such as is shown in the dotted lines, and a pedestrian's foot cannot become entangled with the side rail 28 or rail 96. In other words, the safety belting moves in and out with the platforms as they round a curved portion of the track.

An additional feature which may be utilized with the pedestrian carrier 20 is a seat member generally designated 104 which comprises an inverted U-shaped frame 106 secured to the minor platform sections 40. A seat portion 108 may be secured by means of hinges 110 to the frame 106 and when not in use the seat may be moved to an inoperative position. By tilting the upper part of the frame 106 rearwardly the person standing behind the seat may utilize the frame as a hand support. If seats are not desired upon the carrier, hand posts may be inserted in the minor platform sections to assist and steady pedestrians as the carrier moves about the track.

While the use of rails 33 and rollers 68 together with the guide assembly 36 is preferred, the bearing supports and guide means could be combined into a single structure such as a ball race where the platforms would bear upon and be guided around the track.

While the invention is herein shown and described in what is conceived to be the most practical and preferred embodiment, it is recognized that departures may be made therefrom within the scope of the invention which is not limited to the details disclosed herein but is to be accorded the full scope of the claims so as to embrace any and all equivalent devices.

I claim:

1. An articulated generally planular horizontal pedestrian transporting structure comprising a supporting track means, a guide track means disposed within said supporting track means, a plurality of articulated platform members disposed contiguous one to the next in linear series, each of said platform members including a forward major section and a rear minor section hingedly connected one to the other thereby allowing each major section generally unrestricted vertical movement independent from the connected minor section, each minor section being provided with bearing supports movably engaging the supporting track means, each major section being provided with a follower element movably engaging the guide track means, said bearing supports each including a tie member pivotally connected to a next in series follower element in a substantially remote location from the hinged connection between the major and minor sections thereby allowing each platform movement laterally independent from each other, and drive means imparting linear movement to at least one of the platform members through said bearing supports.

2. An articulated generally planular horizontal pedestrian transporting structure as defined in claim 1 wherein said forward major section includes a convex arcuate forward edge, and said minor section includes a concave arcuate rear edge juxtaposed and overlapped by the convex arcuate forward edge of a major section of a platform member next in linear series thereby creating a relatively uninterrupted pedestrian supporting surface.

3. An articulated generally planular horizontal pedestrian transporting structure as defined in claim 1 wherein a pedestrian seat is mounted on each of said platform members.

4. An articulated generally planular horizontal pedestrian transporting structure as defined in claim 1 wherein a foot safety webbing means is provided on the arcuate portions of said planular surface and adapted to move laterally with respect to the supporting track means and constantly engaging the individual platform members irrespective of the lateral movement of said platform members.

5. An articulated generally planular horizontal pedestrian transporting structure as defined in claim 1 wherein said bearing supports include wheels and wherein said follower element includes a wheel rotatably mounted normal to the axis of said wheels of said bearing supports.

6. An endless pedestrian carier comprising a pair of spaced apart generally parallel supporting tracks, a pair of endless spaced apart generally parallel guide tracks disposed between said supporting tracks, a plurality of articulated pedestrian platform members disposed over said supporting tracks contiguous one to the next in linear series, said platform members each including a first and second section hingedly connected together thereby allowing each first section generally unrestricted movement independent from the connected second section, a bearing support secured to said second section and including support track engaging wheels, a follower element mounted on said first section and including a guide wheel adapted to fit between said guide tracks, said bearing support also including a tie member pivotally connected to a next in series follower element in a substantially remote location from the hinged connection between the first and second sections to articulate said platform members thereby allowing each platform movement laterally independent from each other and motor drive means imparting linear movement to at least one of the platform members through said track engaging wheels.

7. An endless pedestrian carrier as defined in claim 6 wherein said motor drive means includes a plurality of motor drive means spaced around said carrier and each drive means imparting linear movement to at least one of the platform members.

8. An endless pedestrian carrier as defined in claim 6 wherein said motor drive means includes a motor, a plurality of cooperating pulleys operatively connected to said motor, and belt means on said pulleys which are adapted to engage said track engaging wheels.

9. An endless pedestrian carrier as defined in claim 8 wherein said motor drive means includes roller elements underlying and engaging said belt means where said track engaging wheels engage said belt means.

10. An articulated generally planular horizontal pedestrian transporting structure comprising a supporting track means, a guide track means disposed within said supporting track means, a plurality of articulated platform members disposed contiguous one to the next in linear series, each of said platform members including a forward major section and a rear minor section hingedly connected one to the other thereby allowing each major section generally unrestricted vertical movement independent from the connected minor section, each minor section being provided with bearing supports movably engaging the supporting track means, each major section being provided with a follower element movably engaging the guide track means, said bearing supports each including a tie member pivotally connected to a next in series follower element in a substantially remote location from the hinged connection between the major and minor sections thereby allowing each platform movement laterally independent from each other, at least one motor drive means imparting linear movement to at least one of the platform members, said motor drive means including a motor, a plurality of cooperating pulleys operatively connected to said motor, belt means on said pulleys which are adapted to engage the bearing supports and roller elements underlying and engaging said belt means where said bearing supports engage said belt means.

References Cited by the Examiner

UNITED STATES PATENTS

| 1,216,560 | 2/17 | Gallinant | 104—31 |
| 1,766,538 | 6/30 | Prescott | 104—137 |
| 1,933,554 | 11/33 | Holmes | 198—181 |
| 2,044,134 | 6/36 | Storer | 104—25 |
| 2,057,173 | 10/36 | Waalkes | 104—172 X |
| 2,850,149 | 9/58 | Bankauf | 198—181 |
| 2,855,092 | 10/58 | Beech | 198—181 |
| 2,981,202 | 4/61 | Turner | 104—25 |

FOREIGN PATENTS 568,091  12/23  France.

LEO QUACKENBUSH, *Primary Examiner.*